(12) United States Patent
Yamazaki et al.

(10) Patent No.: US 7,486,365 B2
(45) Date of Patent: Feb. 3, 2009

(54) LIQUID CRYSTAL DEVICE AND ELECTRONIC APPARATUS

(75) Inventors: Katsunori Yamazaki, Matsumoto (JP); Toshiharu Matsushima, Suwa (JP)

(73) Assignee: Epson Imaging Devices Corporation, Tokyo (JP)

( * ) Notice: Subject to any disclaimer, the term of this patent is extended or adjusted under 35 U.S.C. 154(b) by 414 days.

(21) Appl. No.: 11/324,342

(22) Filed: Jan. 4, 2006

(65) Prior Publication Data

US 2006/0215101 A1    Sep. 28, 2006

(30) Foreign Application Priority Data

Mar. 25, 2005    (JP)    ............... 2005-087820

(51) Int. Cl.
    *G02F 1/1343*    (2006.01)
(52) U.S. Cl. ............ 349/143; 349/122; 349/123; 349/156; 349/141
(58) Field of Classification Search ............ 349/114, 349/122, 138, 139, 141, 143, 144, 156, 126, 349/123
    See application file for complete search history.

(56) References Cited

U.S. PATENT DOCUMENTS

| | | | |
|---|---|---|---|
| 5,641,974 A * | 6/1997 | den Boer et al. ............... 257/59 |
| 5,994,721 A * | 11/1999 | Zhong et al. ................. 257/89 |
| 5,995,182 A | 11/1999 | Watanabe et al. | |
| 6,088,078 A | 7/2000 | Kim et al. | |
| 6,266,118 B1 | 7/2001 | Lee et al. | |
| 6,577,368 B1 | 6/2003 | Yuh et al. | |
| 6,600,540 B2 * | 7/2003 | Yamakita et al. ............ 349/139 |
| 6,603,525 B2 * | 8/2003 | Yamakita et al. ............ 349/139 |
| 2003/0095223 A1 | 5/2003 | Song | |

FOREIGN PATENT DOCUMENTS

| | | |
|---|---|---|
| CN | 1491371 A | 4/2004 |
| JP | A-09-329805 | 12/1997 |
| JP | A-11-316383 A | 11/1999 |
| JP | A-2000-131717 A | 5/2000 |
| JP | A 2001-330844 | 11/2001 |
| JP | A 2001-330855 | 11/2001 |
| KR | A-1999-0047252 | 7/1999 |
| KR | A-2003-0073225 | 9/2003 |

OTHER PUBLICATIONS

Nikkei Electronics, Jan. 3, 2005; pp. 20-21 (w/partial English Translation—4 pages).

* cited by examiner

*Primary Examiner*—Brian M Healy
(74) *Attorney, Agent, or Firm*—Oliff & Berridge, PLC (57) ABSTRACT

A liquid crystal device includes: a pair of substrates with liquid crystal interposed therebetween; a first electrode formed on one of the pair of substrates; an insulating layer formed on the first electrode; and a second electrode that is formed on the insulating layer corresponding to a pixel region so as to generate an electric field, the electric field being generated between the first and second electrodes. The first electrode is provided with a plurality of apertures within the pixel region.

13 Claims, 8 Drawing Sheets

COMPARATIVE EXAMPLE

LIQUID CRYSTAL DEVICE AND ELECTRONIC APPARATUS

BACKGROUND

1. Technical Field

The present invention relates to a liquid crystal device suitable for being used to display various information and to an electronic apparatus.

2. Related Art

In recent years, a liquid crystal device which adopts a so-called transverse electric field system or IPS (In-Plane Switching) system has come to the attention. In the system, the direction of an electric field applied to liquid crystal is set to the direction substantially parallel to a substrate. Compared with a TN (Twisted Nematic) system or the like, this system is advantageous in that the viewing angle characteristics can be improved.

However, in such a liquid crystal device, a pixel electrode made of a transparent material such as ITO (Indium Tin Oxide) and a common electrode generating a transverse electric field, the transverse electric field being generated between the pixel electrode and the common electrode, are generally provided in the same layer. For this reason, liquid crystal molecules positioned in the upper side of the pixel electrode are not sufficiently driven, thereby reducing transmittance or the like.

Subsequently, in order to solve this problem, a liquid crystal device which adopts a transverse electric field system is recently proposed, the transverse electric field system having a structure where a layer having a common electrode formed thereon is provided in the lower side of a layer having a pixel electrode formed thereon. The system is generally referred to as an FFS (Fringe Field Switching) system.

By such a structure, a transverse electric field can also be applied to liquid crystal molecules positioned in the upper side of the pixel electrode. Therefore, the liquid crystal molecules existing in the above position can be sufficiently driven. As a result, compared with the above-described liquid crystal device which adopts a general transverse electric field system, the liquid crystal device of an FFS-system is advantageous in that the transmittance or the like can be improved.

Examples of the liquid crystal device having such type of construction are described in 'Nikkei Electronics, Jan. 3, 2005, P20 to P21', JP-A-2001-330844, and JP-A-2001-330855. In the examples of the liquid crystal device described above, a pixel electrode is formed in a V shape. This structure causes two-directional transverse electric fields to be generated within one pixel, when the liquid crystal is driven. Therefore, two alignment states of liquid crystal can be created within the one pixel, so that a change in the viewing angle can be reduced.

SUMMARY

In the above-described liquid crystal device, the pixel electrode is formed in a V shape. For this reason, in a region where two sides of the V-shaped pixel electrode are closed so as to form a triangle, liquid crystal molecules cannot be sufficiently driven, causing an aperture ratio to decrease.

An advantage of some aspects of the invention is that it provides an FFS-system liquid crystal device, in which a change in the viewing angle can be reduced and an aperture ratio can be improved, and an electronic apparatus.

According to an aspect of the invention, a liquid crystal device includes: a pair of substrates with liquid crystal interposed therebetween; a first electrode formed on one of the pair of substrates; an insulating layer formed on the first electrode; and a second electrode that is formed on the insulating layer corresponding to a pixel region so as to generate an electric field, the electric field being generated between the first and second electrodes. The first electrode is provided with a plurality of apertures within the pixel region.

The above-described liquid crystal device includes the pair of substrates with liquid crystal interposed therebetween. One of the pair of substrates includes the first electrode serving as a common electrode, the insulating layer formed on the first electrode, and the second electrode serving as a pixel electrode which is formed on the insulating layer corresponding to a pixel region so as to generate an electric field, the electric field being generated between the first and second electrodes.

The first electrode is made of an alloy mainly including, for example, Al (aluminum), Ag (silver), Cr (chrome), Ta (tantalum), Ni (nickel), Au (gold), Cu (copper), Pt (platinum), or the like. The insulating layer is formed of, for example, acrylic resin, SiNx, SiOx, or the like. The second electrode is formed of a transparent material such as ITO. In the liquid crystal device, when liquid crystal is driven, a transverse-directional electric field (a transverse electric field) is generated between the first electrode serving as a common electrode and the second electrode serving as a pixel electrode, so that the alignment of liquid crystal is controlled. In other words, an FFS-system liquid crystal device can be constructed.

In particular, in the liquid crystal device, the first electrode includes a plurality of apertures in the pixel region so that an electric field becomes non-uniform. It is preferable that the plurality of apertures be formed in a rectangular shape. Further, preferably, an alignment film subjected to a rubbing process in a predetermined direction is formed on the second electrode, the second electrode has a plurality of straight line shaped conductive sections which extend in the predetermined direction and are disposed at a distance therebetween in a direction crossing the predetermined direction, and the respective apertures of the first electrode are provided in positions corresponding to the respective conductive sections in a staggered manner. In addition, it is preferable that the insulating layer be formed within the plurality of apertures.

Accordingly, in the liquid crystal device, when liquid crystal is driven, an electric field generated between the conductive sections adjacent to each other within the pixel region does not become uniform. Therefore, an equipotential line generated to extend in the rubbing direction is refracted or distorted in the vicinities of the respective apertures where the first electrode does not exist. Thereby, the applied electric fields are not parallel to each other, which makes it easy for the liquid crystal molecules to operate. In this case, the liquid crystal molecules are basically realigned in the direction substantially perpendicular to the rubbing direction. However, in the respective apertures of the first electrode and the vicinities thereof, the liquid crystal molecules are realigned in a right oblique direction and left oblique direction due to the influence of the curved equipotential line which is generated in the vicinities of the respective apertures. At this time, the liquid crystal molecules realigned in an arbitrary right-oblique direction are substantially symmetrical with the liquid crystal molecules realigned in an arbitrary left-oblique direction on the basis of a predetermined reference line. In other words, within the pixel region, two realignment states of liquid crystal molecules are formed, which are in the substantially symmetrical positional relationship with respect to a predetermined reference line. For this reason, a change in the viewing angle can be reduced, and the color variation can be prevented from occurring (can be corrected). In other words, in the liquid crystal device, even though the second electrode is not formed in a V shape, the color variation can be corrected.

In the liquid crystal device, the plurality of conductive sections, which are elements of the second electrode, are formed in a straight line shape, not in a V shape. Therefore, a region where liquid crystal cannot be driven, that is, a wasted region which does not contribute to display is not formed. Accordingly, an aperture ratio can be improved, so that a bright display image is obtained.

In the liquid crystal, since the rubbing direction is set in one direction, a contrast and a gradient of transmittance with respect to an applied potential can be set to be steep, respectively.

Further, in the liquid crystal device, preferably, the length of each of the apertures corresponding to the direction crossing the predetermined direction (rubbing direction) is set to be larger than the length of each of the conductive sections corresponding to the direction crossing the predetermined direction (rubbing direction), and a portion of each of the apertures overlaps a portion of each of the corresponding conductive sections in plan view. In this case, preferably, the plurality of conductive sections are composed of a first conductive section, a second conductive section, a third conductive section, a fourth conduction section, and a fifth conductive section, and the respective apertures are provided in positions corresponding to a vicinity of a left end of the first conductive section, a vicinity of a right end of the second conductive section, a vicinity of a left end of the third conductive section, a vicinity of a right end of the fourth conductive section, and a vicinity of a left end of the fifth conductive section.

Furthermore, in the liquid crystal device, preferably, the plurality of conductive sections are composed of a first conductive section, a second conductive section, a third conductive section, a fourth conduction section, and a fifth conductive section, and the respective apertures are provided in positions corresponding to a lower position in a vicinity of a left end of the first conductive section, lower and upper positions in a vicinity of a right end of the second conductive section, lower and upper positions in a vicinity of a left end of the third conductive section, lower and upper positions in a vicinity of a right end of the fourth conductive section, and an upper position in a vicinity of a left end of the fifth conductive section.

Furthermore, in the liquid crystal device, preferably, at least one aperture is provided in a position corresponding between the conductive sections adjacent to each other. Accordingly, when liquid crystal is driven, an electric field generated between the conductive sections adjacent to each other is made non-uniform, and thus the equipotential line can be curved or deformed in a vicinity of at least one aperture.

Furthermore, in the liquid crystal device, preferably, the plurality of conductive sections are composed of a first conductive section, a second conductive section, a third conductive section, a fourth conduction section, and a fifth conductive section, and the respective apertures are provided in positions corresponding to a lower position in a vicinity of a left end of the first conductive section, a lower position in a vicinity of a right end of the second conductive section, a lower position in a vicinity of a left end of the third conductive section, and a lower position in a vicinity of a right end of the fourth conductive section.

Furthermore, in the liquid crystal device, preferably, the plurality of conductive sections are composed of a first conductive section, a second conductive section, a third conductive section, a fourth conduction section, and a fifth conductive section, and the respective apertures are provided in positions corresponding to an upper position in a vicinity of a right end of the second conductive section, an upper position in a vicinity of a left end of the third conductive section, an upper position in a vicinity of a right end of the fourth conductive section, and an upper position in a vicinity of a left end of the fifth conductive section.

According to another aspect of the invention, an electronic apparatus includes the above-described liquid crystal device as a display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings. In the following various embodiments, the invention is applied to a liquid crystal device.

First Embodiment

Construction of Liquid Crystal Device

Figure 1:
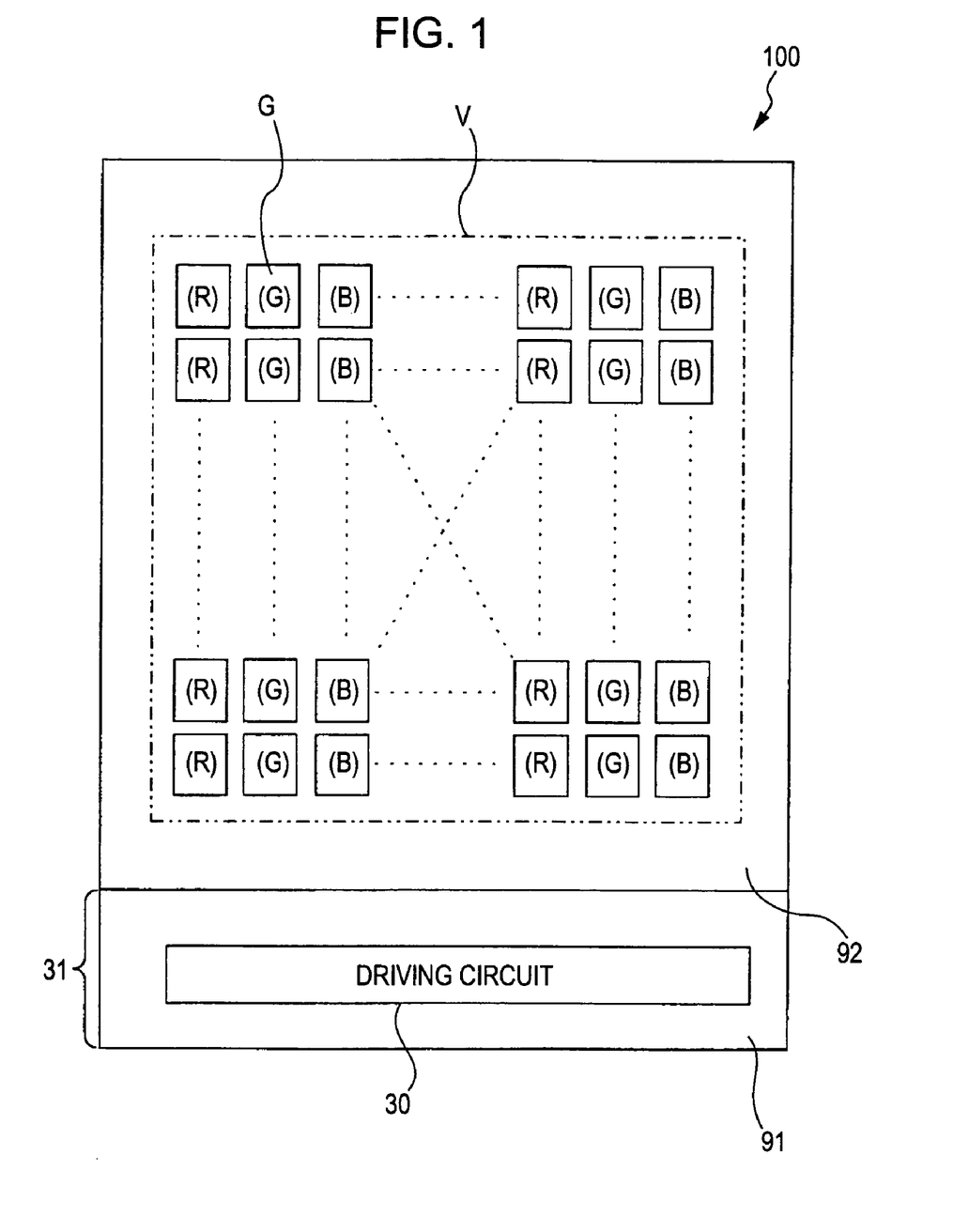
FIG. 1 is a plan view schematically illustrating the construction of a liquid crystal device according to a first embodiment of the invention.

FIG. 1 is a plan view schematically illustrating the construction of a liquid crystal device 100 of the invention.

The liquid crystal device 100 is a reflective liquid crystal device and is also an active-matrix-driving-type liquid crystal device using switching elements such as a TFD (Thin Film Diode) element and a TFT (Thin Film Transistor) element. The liquid crystal device 100 is a so-called FFS-system liquid crystal device where, in a substrate having electrodes formed thereon, an electric field E is generated in a direction substantially parallel to the surface of the substrate to control the alignment of liquid crystal molecules. For this reason, in the liquid crystal device 100, a wide viewing angle can be obtained.

As shown in FIG. 1, in the liquid crystal device 100, an element substrate 91 is bonded to a color-filter substrate 92 disposed to face the element substrate 91 through a frameshaped sealant, and liquid crystal is then sealed therebetween to form a liquid crystal layer 4.

On the element substrate 91, signal electrodes, common electrodes (hereinafter, also referred to as 'first electrodes'), pixel electrodes (hereinafter, also referred to as 'second electrodes'), a driving circuit, and the like are formed. Among them, the driving circuit 30 is mounted on an extending region 31 of the element substrate 91 extending from one end of the color filter substrate 92 to the outside, as shown in FIG. 1. The driving circuit 30 are connected to the signal electrodes and common electrodes (not shown) so as to drive the signal electrodes and common electrodes. In addition, the driving circuit 30 is also connected to a wiring substrate (not shown) such as a flexible substrate. Accordingly, signals and electric power are supplied to the liquid crystal device 100 from an electronic apparatus such as a mobile phone, an information terminal, or the like. Each pixel electrode is formed in a pixel region G (a rectangular region shown in FIG. 1) which is a minimum display unit. Further, a region, in which the plurality of pixel regions G are arranged in a matrix in the vertical and horizontal direction of the drawing, is an effective display region V (a region surrounded by a double-dashed chain line). In the effective display region V, images such as characters, numbers, and figures are displayed.

On the color filter substrate 92, coloring layers 8R, 8G, and 8B are formed, each layer having any one of the three colors of red, green, and blue. Each of the coloring layers 8R, 8G, and 8B is formed in a position corresponding to one pixel region G. In the following description, when a coloring layer is specified regardless of the color thereof, the coloring layer is simply referred to as a 'coloring layer 8'. When a coloring layer is specified according to the color, the coloring layer is referred to as the 'coloring layer 8R' or the like.

Construction of One Pixel Region

Figure 2A:
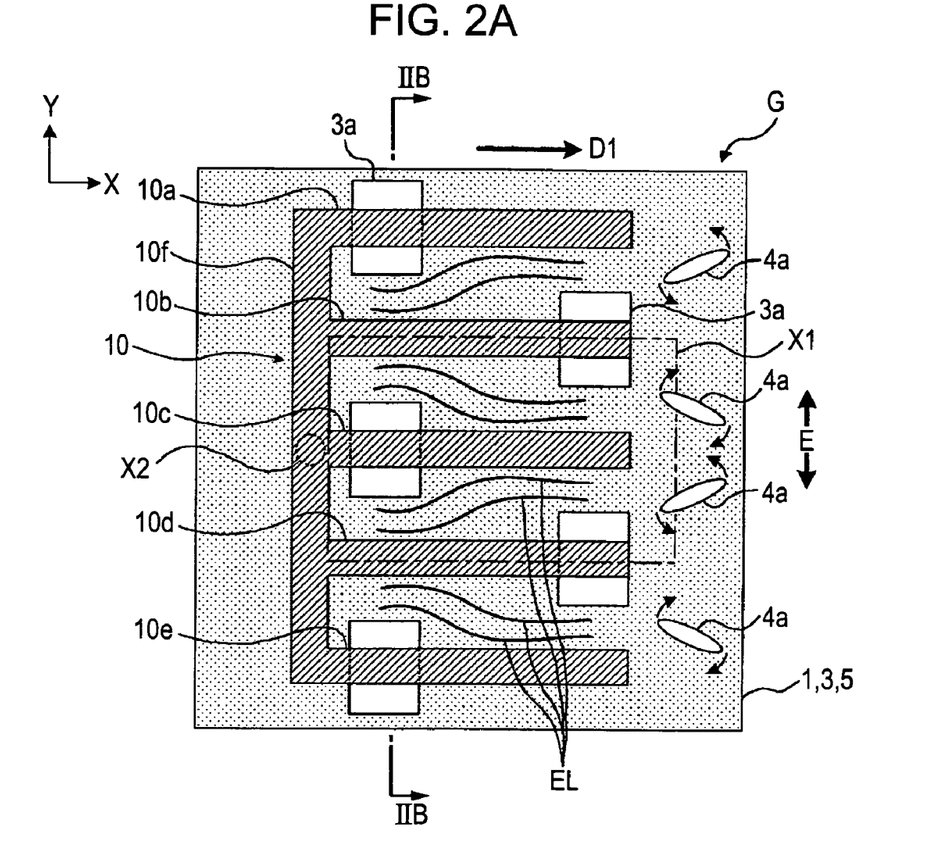
FIG. 2A is a plan view illustrating the construction of one pixel region G in the first embodiment.
Figure 2B:
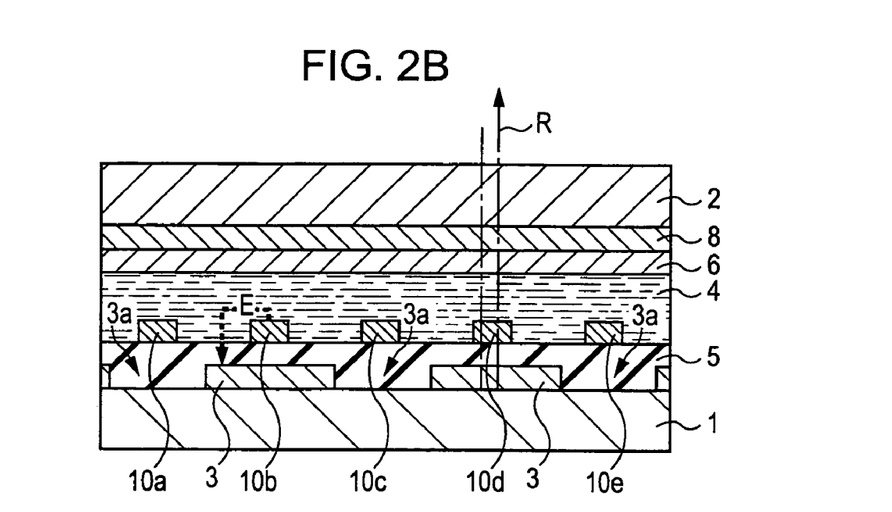
FIG. 2B is a partial cross-sectional view illustrating the construction of one pixel region G in the first embodiment.

With reference to FIGS. 2A and 2B, the construction of one pixel region G will be described. FIG. 2A is a plan view corresponding to one pixel region G in the element substrate 91. In FIG. 2A, the same direction as a rubbing direction D1 indicates the X direction, and the direction perpendicular to the rubbing direction indicates the Y direction. FIG. 2B is a cross-sectional view taken along the line IIB-IIB of FIG. 2A. Further, FIG. 2B also illustrates the construction of the color filter 92 corresponding to one pixel region G.

As shown in FIG. 2B, the common electrode 3 generating a transverse-direction electric field E (hereinafter, referred to as a 'transverse electric field') between respective elements of the pixel electrode 10 to be described later is formed on a lower substrate 1. The common electrode 3, which is formed on one entire surface of the lower substrate 1, has a plurality of apertures 3a formed in one pixel region G. The shape and formation position of the aperture 3a will be described below. The common electrode 3 also functions as a reflecting substrate which reflects light incident on the liquid crystal device 100. For this reason, the common electrode 3 is made of an alloy mainly including Al (aluminum), Ag (silver), Cr (chrome), Ta (tantalum), Ni (Nickel), Au (gold), Cu (copper), Pt (platinum), and the like. Thereby, it is possible to implement the liquid crystal device 100 having high reflectance.

On the lower substrate 1 corresponding to the positions of the apertures 3a in the common electrode 3, inside the apertures 3a, and on the common electrode 3, an insulating layer 5 composed of acrylic resin, SiNx, SiOx, or the like is formed. The insulating layer 5 has one contact hole (aperture) in one pixel region G. As shown in FIG. 2A, the contact hole is formed in the position corresponding to a predetermined position (region X2) of a sixth conductive section 10f which is an element of the pixel electrode 10 to be described below. The contact hole has a function of electrically connecting the pixel electrode 10 to switching elements (not shown).

On the insulating layer 5, the pixel electrode 10 composed of a transparent conductive material such as ITO is formed. As shown in FIG. 2A, the pixel electrode 10 has a comb shape in plan view. Specifically, the pixel electrode 10 is composed of a first conductive section 10a, a second conductive section 10b, a third conductive section 10c, a fourth conductive section 10d, a fifth conductive section 10e, and a sixth conductive section 10f, which are formed in a straight line shape (branch). These elements are integrally formed. In the cross-sectional view of FIG. 2B, the elements of the pixel electrode 10 on the insulating layer 5 are shown, excluding the sixth conductive section 10f.

As shown in FIG. 2A, the first conductive section 10a, the second conductive section 10b, the third conductive section 10c, the fourth conductive section 10d, and the fifth conductive section 10e are formed so as to extend in the X direction, that is, the rubbing direction D1 to be described below. The first and second conductive sections 10a and 10b, the second and third conductive sections 10b and 10c, the third and fourth conductive section 10c and 10d, and the fourth and fifth conductive section 10d and 10e are formed at a predetermined distance. The sixth conductive section 10f is formed so as to extend in the Y direction, that is, in the direction substantially perpendicular to the rubbing direction D1. The respective ends of the first conductive section 10a, second conductive section 10b, third conductive section 10c, fourth conductive section 10d, and fifth conductive section 10e are connected to one side of the sixth conductive section 10f.

The sixth conductive section 10f positioned in the region X2 is formed up to the inside of the contact hole to be electrically connected to a switching element (not shown). The switching element is connected to a signal electrode (not shown). For this reason, the switching operation of the switching element allows an electric potential according to data written through the signal electrode to be applied to the pixel electrode 10.

On the pixel electrode 10 and the insulating layer 5, an alignment film (not shown) is formed. The surface of the alignment film is subjected to a rubbing process in the arrow D1 direction, as shown in FIG. 2A. In the following descriptions, the arrow D1 direction is referred to as a 'rubbing direction D1'. For this reason, liquid crystal molecules 4a are aligned in the rubbing direction D1, when liquid crystal is not driven. As described above, one pixel region G is constructed in the element substrate 91.

In the meantime, the coloring layer 8 is formed on an upper substrate 2, and an alignment film 6 is formed on the coloring layer 8. As such, one pixel region G is constructed in the color filter substrate 92. As shown in FIG. 2B, liquid crystal is sealed between the element substrate 91 and the color filter substrate 92, and a liquid crystal layer 4 is formed therebetween.

In particular, in the liquid crystal device 100, the plurality (five in the present embodiment) of apertures 3a are provided so as to correspond to the respective conductive sections (branch sections) of the corresponding common electrode (the first electrode) 3 within each pixel region G. Each of the apertures 3a is formed to have a rectangular shape in plan view. The length of each aperture 3a in the Y direction is set to be larger than the respective lengths (widths) of the first conductive section 10a, second conductive section 10b, third conductive section 10c, fourth conductive section 10d, and fifth conductive section 10e in the Y direction. As shown in FIG. 2A, the respective apertures 3a are provided in the positions overlapping the respective portions of the first conductive section 10a, second conductive section 10b, third conductive section 10c, fourth conductive section 10d, and fifth conductive section 10e. Further, the apertures 3a are provided so as to be disposed in a staggered manner (disposed alternately) with respect to the respective conductive sections.

Specifically, as shown in FIG. 2A, the respective apertures 3a are provided in the positions corresponding to the vicinity of the left end of the first conductive section 10a, the vicinity of the right end of the second conductive section 10b, the vicinity of the left end of the third conductive section 10c, the vicinity of the right end of the fourth conductive section 10d, and the vicinity of the left end of the fifth conductive section 10e, and in the positions overlapping the respective portions of the conductive sections. Moreover, the invention is not limited thereto. The respective apertures 3a may be provided in the positions corresponding to the vicinity of the right end of the first conductive section 10a, the vicinity of the left end of the second conductive section 10b, the vicinity of the right end of the third conductive section 10c, the vicinity of the left end of the fourth conductive section 10d, and the vicinity of the right end of the fifth conductive section 10e, and in the positions overlapping the respective portions of the conductive sections.

In the liquid crystal device 100 having such a construction, when liquid crystal is driven, the liquid crystal molecules 4a aligned along the rubbing direction D1 are realigned in the direction substantially perpendicular to the rubbing direction D1 by the transverse electric field E generated in the Y direction in principle. In addition, the extending direction of the equipotential line E1 generated at that time becomes the rubbing direction D1.

When reflective display is performed in the liquid crystal device 100 of the first embodiment, external light incident on the liquid crystal device 100 proceeds along a path R shown in FIG. 2B. In other words, the external light incident on the liquid crystal device 100 is reflected by the common electrode 3, serving as a reflecting electrode, to reach a viewer. In this case, the external light passes through a region where the coloring layer 8, the pixel electrode 10, and the insulating layer 5 are formed and then is reflected by the common electrode 3 positioned at the lower side of the insulating layer 5. Then, the external light once again passes through the insulating layer 5, the pixel electrode 10, and the coloring layer 8 so as to exhibit a desired color or brightness. As such, a desired color display image is viewed by a viewer.

Figure 4:
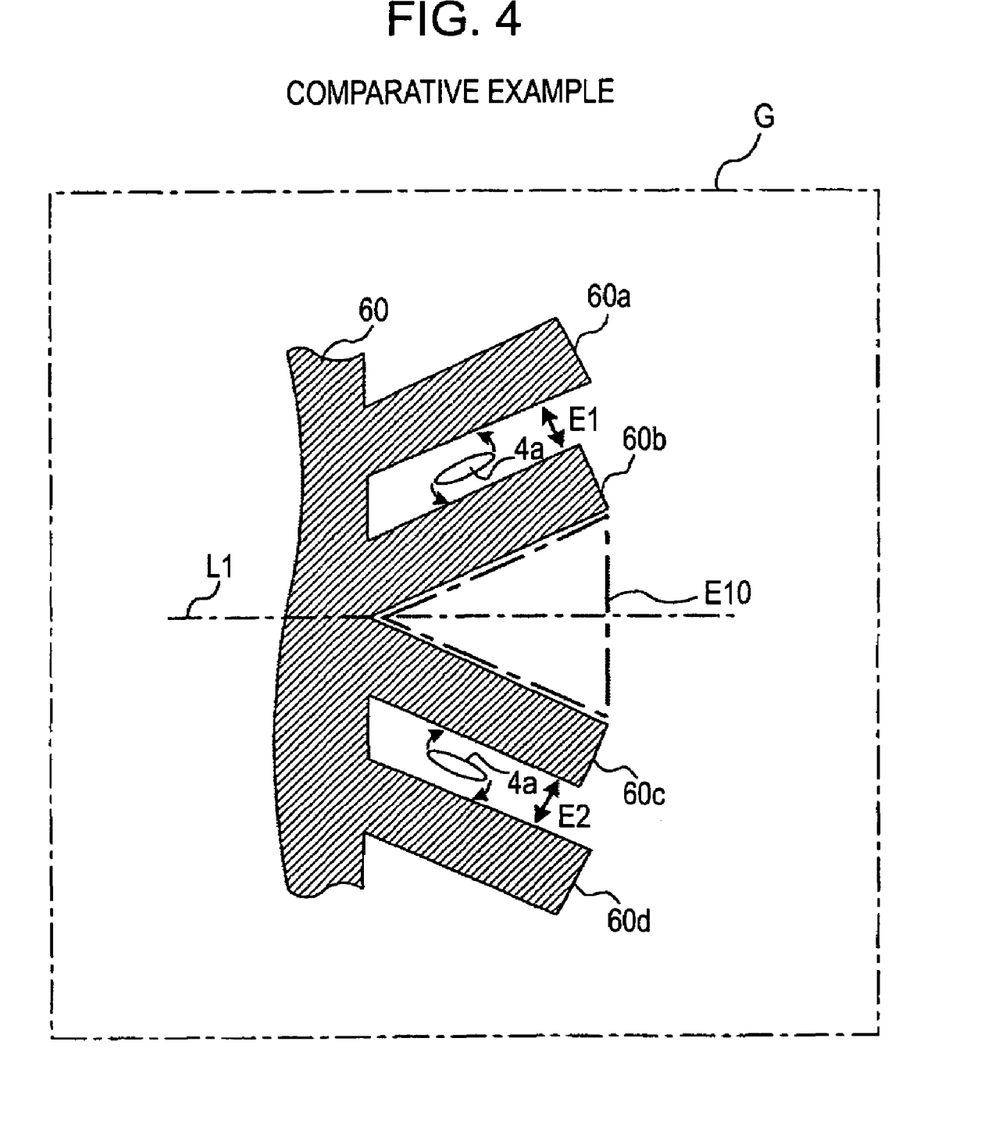
FIG. 4 is a plan view schematically illustrating the construction of one pixel region G in a comparative example.

Next, the distinctive effects of the first embodiment according to the invention as compared with a comparative example will be described. FIG. 4 is an expanded partial plan view illustrating a portion of the pixel electrode 60 according to the comparative example. In FIG. 4, a dashed line in a shape of a rectangle indicates one pixel region G.

First, the construction and effects of the comparative example will be described.

A liquid crystal device according to the comparative example is a so-called FFS-system liquid crystal device as in the first embodiment. As shown in FIG. 4, a pixel electrode 60 according to the comparative example is composed of a first conductive section 60a, a second conductive section 60b, a third conductive section 60c, and a fourth conductive section 60d. The first and second conductive sections 60a and 60b are formed so as to extend parallel to each other and in the right upper oblique direction. In addition, the first and second conductive sections 60a and 60b are formed at a predetermined distance. The third and fourth conductive sections 60c and 60d are formed so as to extend parallel to each other and in the right lower oblique direction. In addition, the third and fourth conductive sections 60c and 60d are formed at a predetermined distance. The first and fourth conductive sections 60a and 60d and the second and third conducive sections 60b and 60c are respectively symmetrical with respect to a reference line L1. In addition, the shape where the second and third conductive sections 60b and 60c are coupled to each other is formed in a V shape.

In the comparative example having such a construction, when liquid crystal is driven, a transverse electric field E1 between the first and second conductive sections 60a and 60b and a transverse electric field E2 between the third and fourth conductive sections 60c and 60d are generated, respectively. Here, the directions of the transverse electric fields E1 and E2 are symmetrical with respect to the reference line L1. For this reason, liquid crystal molecules 4a positioned between the first and second conductive sections 60a and 60b rotate in the counter clockwise direction so as to be realigned in the substantially same direction as the transverse electric field E1. Meanwhile, liquid crystal molecules 4a positioned between the third and fourth conductive sections 60c and 60d rotate in the clockwise direction so as to be realigned in the substantially same direction as the transverse electric field E2.

As such, in the comparative example, there exist two-directional transverse electric fields E which are symmetrical with respect to the reference line L1 within one pixel region G. Therefore, two realignment states of the liquid crystal molecules 4a are formed within one pixel region G. Accordingly, a change in the viewing angle can be reduced. At this time, when the realignment state of the liquid crystal molecules 4a is caused by any one of the transverse electric fields E1 and E2, the refractive anisotropy, which the liquid crystal molecules 4a have, causes a color to be differently viewed according to the direction where the liquid crystal device is viewed by a viewer. In the comparative example, the change in the viewing angle can be reduced because of the above-described effects, which makes it possible to prevent the color variation according to the viewing direction.

However, in the comparative example, when liquid crystal is driven, the transverse electric field is hardly generated in a triangle-shaped region E10 between the second and third conductive sections 60b and 60c. Therefore, the liquid crystal molecules 4a cannot be sufficiently driven in the region E10, and thus an aperture ratio is reduced.

In contrast, in the first embodiment according to the invention, the corresponding common electrode 3 (the first electrode) within each pixel region G is provided with the plurality of apertures 3a. In addition, although the descriptions thereof will be omitted due to redundancy, the shapes of the respective apertures 3a and the positional relationship between the pixel electrode 10 (the second electrode) and the respective apertures 3a are as described above.

Therefore, in the first embodiment of the invention having such a construction, when liquid crystal is driven, the equipotential line EL which is generated to extend in the rubbing direction D1 is curved or distorted in the vicinities of the respective apertures 3a where the common electrode 3 does not exist, as shown in FIG. 2A. Specifically, the equipotential line EL generated between the first and the second conductive sections 10a and 10b, the equipotential line EL generated between the second and third conductive sections 10b and 10c, the equipotential line EL generated between the third and fourth conductive sections 10c and 10d, and the equipotential line EL generated between the fourth and fifth conductive sections 10d and 10e are curved or distorted in the vicinities of the respective apertures 3a corresponding thereto. This is mainly why the transverse electric field E between the adjacent conductive sections becomes non-uniform within the pixel region G because there exist no common electrode 3 in the position corresponding to each aperture 3*a* and the transverse electric field E is hardly generated in each aperture 3*a*. Accordingly, since the applied electric fields are not parallel to each other, the equipotential line EL is curved or distorted in the vicinity of each aperture 3*a* where the common electrode 3 does not exist, which makes it easy for the liquid crystal molecules 4*a* to operate.

Such an action allows the liquid crystal molecules 4*a* positioned between the first and second conductive sections 10*a* and 10*b* and the liquid crystal molecules 4*a* between the third and fourth conductive sections 10*c* and 10*d* to rotate in the counter clockwise direction, respectively, as shown in FIG. 2A. In contrast, the liquid crystal molecules 4*a* positioned between the second and third conductive sections 10*b* and 10*c* and the liquid crystal molecules 4*a* positioned between the fourth and fifth conductive sections 10*d* and 10*e* rotate in the clockwise direction, respectively. In principle, the liquid crystal molecules 4*a* are realigned in the direction substantially perpendicular to the rubbing direction D1. However, as will be described below, the liquid crystal molecules 4*a* are realigned at a predetermined angle in the vicinities of the respective apertures 3*a*.

Figure 3A:
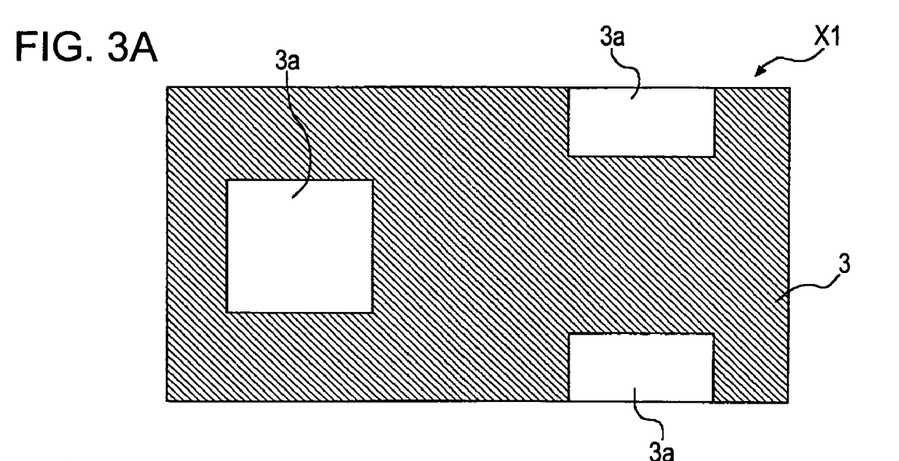
FIGS. 3A to 3C are plan views illustrating a portion corresponding to a region X1 of FIG. 2A.
Figure 3B:
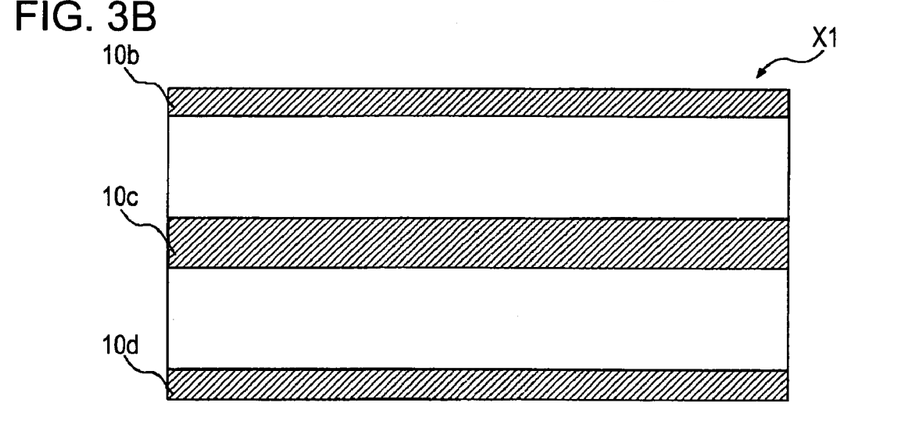
Figure 3C:
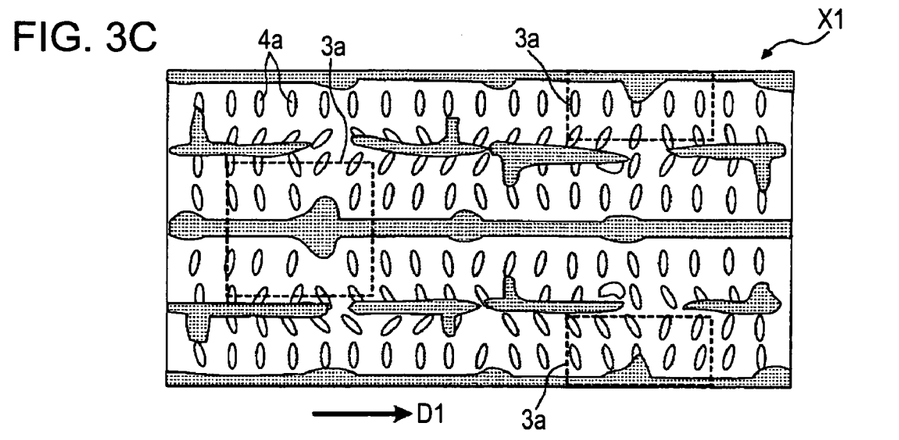

Here, a simulation result of the state where the liquid crystal molecules 4*a* are realigned is shown in FIG. 3C. FIG. 3C illustrates the state where the liquid crystal molecules 4*a* are realigned in the region X1 of FIG. 2A. As a reference, FIG. 3A illustrates the planar construction of only the common electrode 3 corresponding to FIG. 3C, and FIG. 3B illustrates the planar construction of only the pixel electrode 10 corresponding to FIG. 3C. In short, a combination of FIGS. 3A and 3B corresponds to FIG. 3C. In FIG. 3C, a dashed line in a shape of a rectangle indicates the position of each aperture 3*a* of the common electrode 3. FIG. 3C illustrates a display state where the liquid crystal molecules 4*a* are realigned.

As shown in FIG. 3C, the liquid crystal molecules 4*a* are basically realigned in the direction substantially perpendicular to the rubbing direction D1. However, the liquid crystal molecules 4*a* are realigned in the right oblique direction and the left oblique direction in the aperture 3*a* of the common electrode 3 and the vicinity thereof. Further, the liquid crystal molecules 4*a* realigned in the right oblique direction and the liquid crystal molecules 4*a* realigned in the left oblique direction are substantially symmetrical with respect to a predetermined reference line. In other words, within each pixel region G, two realignment states of the liquid crystal molecules 4*a* occur, which are in the substantially symmetrical positional relationship. As a result, a change in the viewing angle can be reduced and the color can be prevented from being varied according to the viewing direction (can be corrected) by the same action as the above described comparative example. In other words, according to the first embodiment of the invention, the color correction can be performed even though the pixel electrode 10 is not formed in a V shape.

In addition, in the first embodiment, the pixel electrode 10 is formed in a comb shape, not in a V shape as in the comparative example. Therefore, the triangle-shaped region is not formed where the liquid crystal cannot be driven as in the comparative example. In other words, in the first embodiment of the invention, the pixel electrode 10 is formed in a comb shape, so that a wasted region is not formed which does not contribute to display. Accordingly, in the first embodiment, an aperture ratio can be improved as compared with the comparative example, so that a bright display image is obtained.

In the liquid crystal, since the rubbing direction D1 is set in one direction, a contrast and a gradient of transmittance with respect to an applied potential can be set to be steep, respectively.

Second Embodiment

Figure 5:
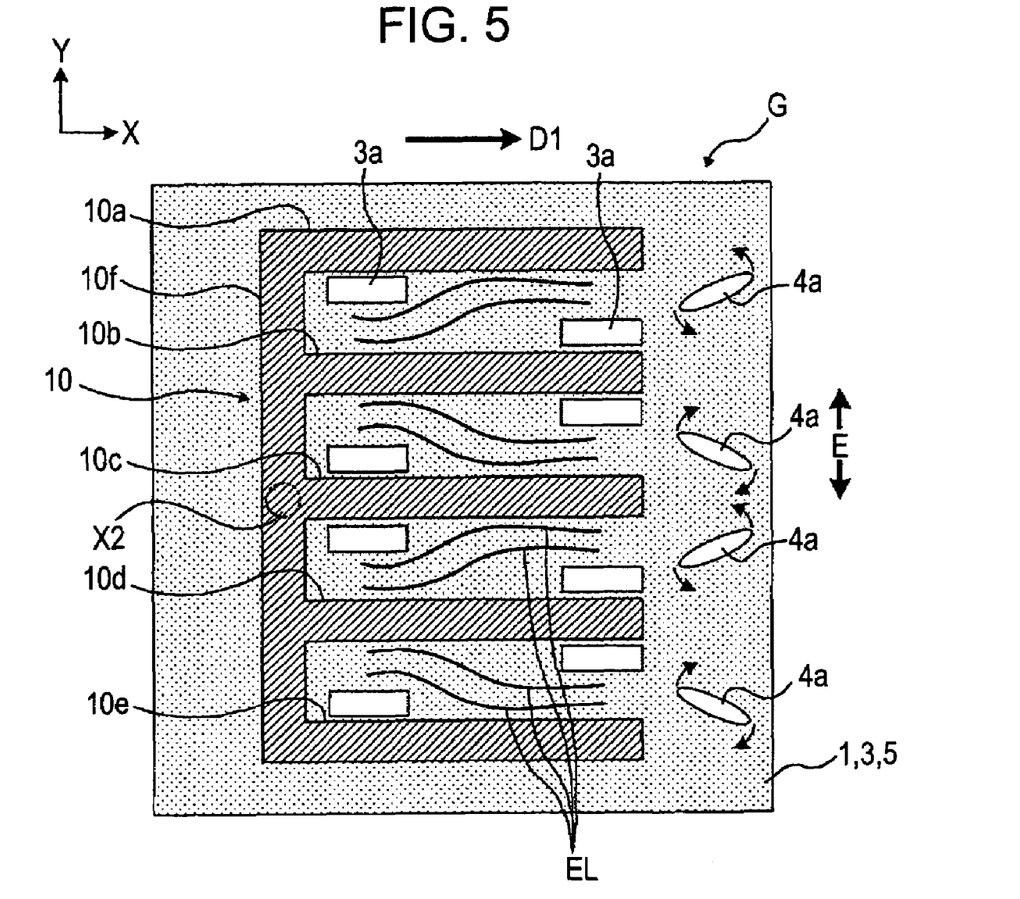
FIG. 5 is a plan view illustrating the construction of one pixel region G in a second embodiment.

The construction of one pixel region G in a liquid crystal device according to a second embodiment of the invention will be described with reference to FIG. 5. FIG. 5 is a plan view illustrating the construction of one pixel region G in an element substrate according to the second embodiment. Hereinafter, like reference numerals are attached to the same elements as in the first embodiment, and the descriptions thereof will be omitted.

In the first embodiment, a portion of each aperture 3*a* of the common electrode 3 overlaps a portion of each conductive section which is an element of the pixel electrode 10 within each pixel region G, in plan view.

In contrast, in the second embodiment, each aperture 3*a* of the common electrode 3 is provided in the position not overlapping the pixel electrode 10 within each pixel region G in plan view and in the position adjacent to the corresponding pixel electrode 10. In addition, the aperture 3*a* of the common electrode 3 extends in the X direction. Between the conductive sections adjacent to each other in the Y direction, at least two apertures 3*a* are provided.

Specifically, the respective apertures 3*a* are provided in the positions corresponding to a lower position in the vicinity of the left end of the first conductive section 10*a*, upper and lower positions in the vicinity of the right end of the second conductive section 10*b*, upper and lower positions in the vicinity of the left end of the third conductive section 10*c*, upper and lower position in the vicinity of the right end of the fourth conductive section 10*d*, and an upper position in the vicinity of the left end of the fifth conductive section 10*e*, as shown in FIG. 5. For this reason, between the first and second conductive sections 10*a* and 10*b*, between the second and third conductive sections 10*b* and 10*c*, between the third and fourth conductive sections 10*c* and 10*d*, and between the fourth and fifth conductive sections 10*d* and 10*e*, two apertures 3*a* are provided respectively. Moreover, the invention is not limited thereto. The respective apertures 3*a* may be provided in the positions corresponding to a lower position in the vicinity of the right end of the first conductive section 10*a*, upper and lower positions in the vicinity of the left end of the second conductive section 10*b*, upper and lower positions in the vicinity of the right end of the third conductive section 10*c*, upper and lower position in the vicinity of the left end of the fourth conductive section 10*d*, and an upper position in the vicinity of the right end of the fifth conductive section 10*e*.

In the second embodiment having such a construction, when liquid crystal is driven, an electric field generated within the pixel region becomes uniform as in the first embodiment. The equipotential line EL which is generated to extend in the rubbing direction D1 is curved or distorted in the vicinities of the respective apertures 3*a* where the common electrode 3 does not exist, which makes it possible to achieve the same effects as in the first embodiment.

Third Embodiment

Figure 6A:
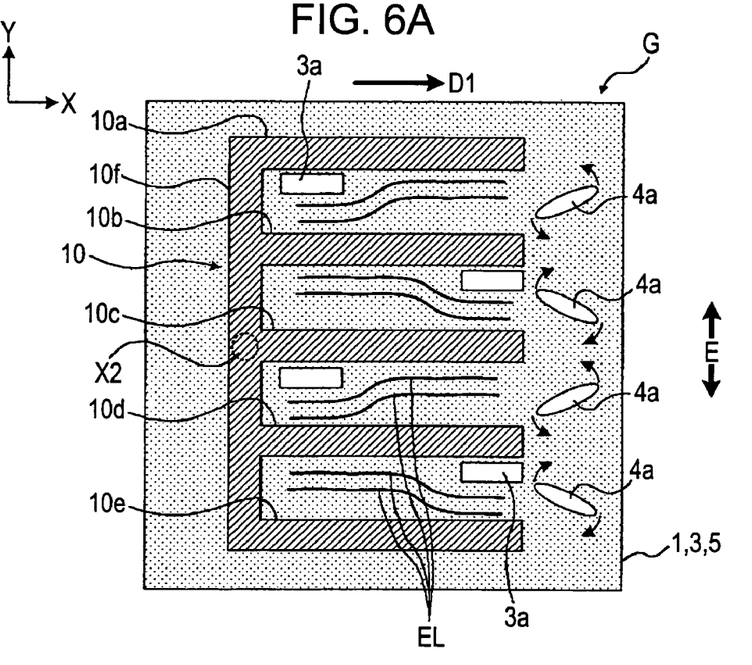
FIGS. 6A and 6B are plan views illustrating the construction of one pixel region G in each example of a third embodiment.
Figure 6B:
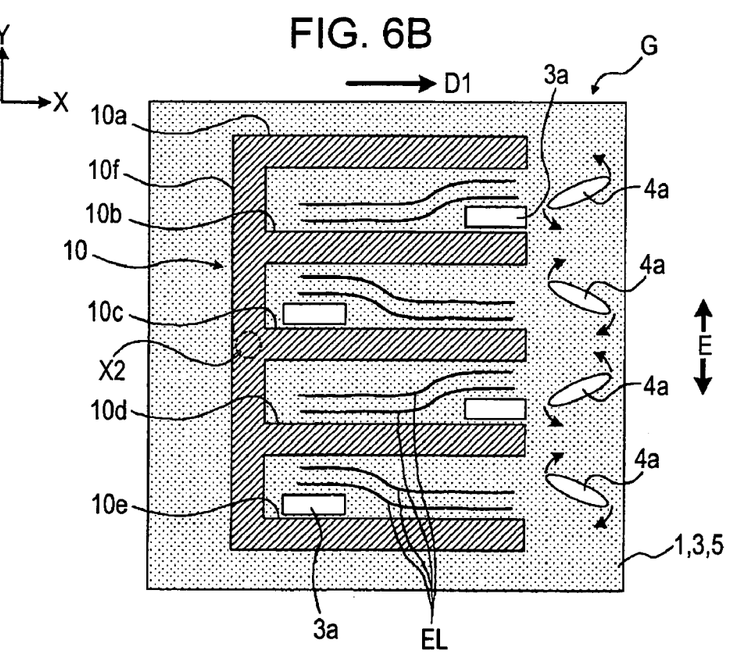

Next, the construction of one pixel region G in a liquid crystal device according to a third embodiment of the invention will be described with reference to FIGS. 6A and 6B. FIG. 6A is a plan view illustrating the construction of one pixel region G in the element substrate, the pixel region G being one example according to the third embodiment. FIG. 6B is a plan view illustrating the construction of one pixel region G in the element substrate, the pixel region G being another example according to the third embodiment. Hereinafter, like reference numerals are attached to the same elements as the first embodiment, and the descriptions thereof will be omitted.

In the second embodiment, each aperture 3a of the common electrode 3 is provided in the position not overlapping the pixel electrode 10 and in the position adjacent to the corresponding pixel electrode 10. In regards to this point, the third embodiment is the same as the second embodiment.

However, the third embodiment is different from the second embodiment in that one aperture 3a is provided between the conductive sections which extend in the X direction and are adjacent to each other in the Y direction. Specifically, in an example of the third embodiment, the respective apertures 3a are provided in the positions corresponding to a lower position in the vicinity of the left end of the first conductive section 10a, a lower position in the vicinity of the right end of the second conductive section 10b, a lower position in the vicinity of the left end of the third conductive section 10c, and a lower position in the vicinity of the right end of the fourth conductive section 10d, as shown in FIG. 6A. On the other hand, in another example of the third embodiment, the respective apertures 3a are provided in the positions corresponding to an upper position in the vicinity of the right end of the second conductive section 10b, an upper position in the vicinity of the left end of the third conductive section 10c, an upper position in the vicinity of the right end of the fourth conductive section 10d, and an upper position in the vicinity of the left end of the fifth conductive section 10e, as shown in FIG. 6B. For this reason, in the respective examples of the third embodiment, the respective apertures 3a are provided to be disposed in a staggered manner with respect to the corresponding pixel electrode 10 in a state not overlapping the pixel electrode 10 within one pixel region G, as shown in FIGS. 6A and 6B.

In the third embodiment having such a construction, when liquid crystal is driven, the equipotential line EL which is generated to extend in the rubbing direction D1 is curved or distorted in the vicinities of the respective apertures 3a where the common electrode 3 does not exist, as in the first and second embodiments, which makes it possible to achieve the substantially same operational effects as in the first and second embodiments.

Modifications

In the first embodiment, at least two apertures 3a are provided between the conductive sections which extend in the X direction and are adjacent to each other in the Y direction. Without being limited thereto, the number of apertures 3a can be increased within the scope without departing from the subject matter of the invention.

In the respective embodiments, the invention is applied to a reflective liquid crystal device. However, without being limited thereto, the invention can be applied to a transmissive or transflective liquid crystal device.

Electronic Apparatus

Next, a case will be described in which the liquid crystal device 100 according to the first embodiment of the invention is used as a display device of an electronic apparatus. Moreover, the liquid crystal devices according to the second and third embodiments can also be applied to the corresponding electronic apparatus.

Figure 7:
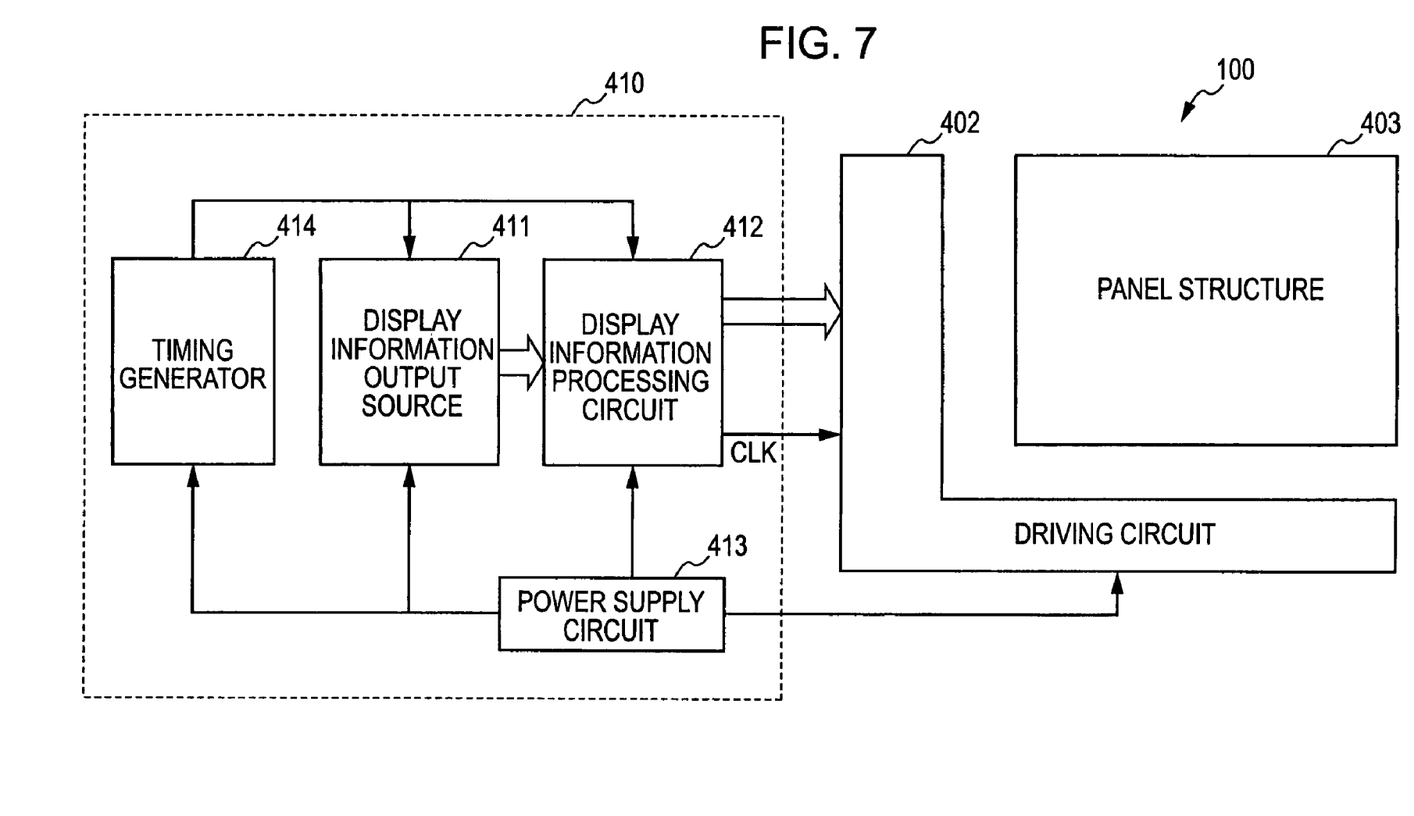
FIG. 7 is a block diagram illustrating a circuit of an electronic apparatus to which the liquid crystal device of the invention is applied.

FIG. 7 is a view schematically illustrating the entire construction of the present embodiment. An electronic apparatus shown in FIG. 7 includes the liquid crystal device 100 and a control unit 410 which controls the liquid crystal device 100. In the drawing, the liquid crystal device 100 is conceptually divided into a panel structure 403 and a driving circuit 402 composed of a semiconductor IC or the like. The control unit 410 includes a display information output source 411, a display information processing circuit 412, a power supply circuit 413, and a timing generator 414.

The display information output source 411 is provided with a memory composed of a ROM (Read Only Memory) or RAM (Random Access Memory), a storage unit composed of a magnetic storage disc or optical storage disc, and a tuning circuit for tuning digital image signals. On the basis of various clock signals generated by the timing generator 414, the display information output source 411 supplies display information, in the form of image signals having a predetermined format, to the display information processing circuit 412.

The display information processing circuit 412 is provided with various known circuits such as a serial-to-parallel conversion circuit, an amplifying/inverting circuit, a rotation circuit, a gamma correction circuit, a clamp circuit, and so on. The display information processing circuit 412 processes input display information and then supplies the image information to the driving circuit 402 together with a clock signal CLK. The driving circuit 402 includes a scanning line driving circuit, a data line driving circuit, and a test circuit. The power supply circuit 413 supplies a predetermined voltage to the above described components.

Next, a specific example of the electronic apparatus to which the liquid crystal device according to any one of the first to third embodiments of the invention can be applied will be described with reference to FIG. 8.

First, an example will be described in which the liquid crystal device according to any one of the first to third embodiments of the invention is applied to a display unit of a portable personal computer (so-called notebook computer). FIG. 8A is a perspective view illustrating the construction of the personal computer. As shown in FIG. 8A, the personal computer 710 is provided with a main body unit 712 including a keyboard 711 and a display unit 713 to which the liquid crystal device according to the invention is applied as a panel.

Further, an example will be described in which the liquid crystal device according to any one of the first to third embodiments of the invention is applied to a display section of a mobile phone. FIG. 8B is a perspective view illustrating the construction of the cellular phone. As shown in FIG. 8B, the mobile phone 720 is provided with a plurality of operation buttons 721, an earpiece 722, a mouthpiece 723, and a display unit 724 to which the liquid crystal device according to any one of the first to third embodiments of the invention is applied.

Figure 8A:
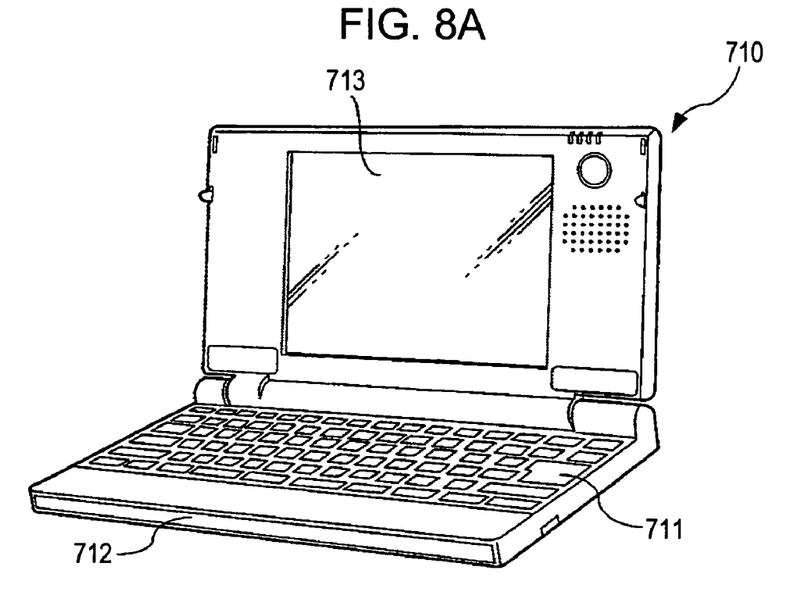
FIGS. 8A and 8B are views illustrating examples of the electronic apparatus to which the liquid crystal device of the invention is applied.
Figure 8B:
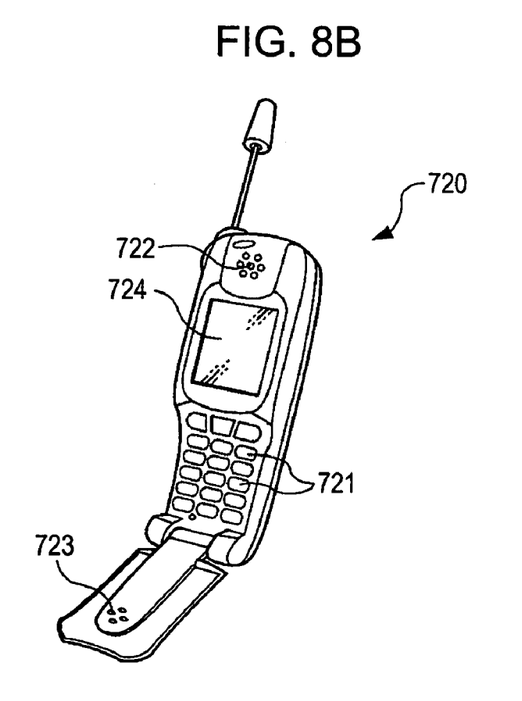

As an electronic apparatus to which the liquid crystal device according to any one of the first to third embodiments of the invention can be applied, a liquid crystal television, a view-finder-type or monitor-direct-view-type video tape recorder, a car navigation device, a pager, an electronic note, an electric calculator, a word processor, a work station, a video phone, a POS terminal, a digital still camera, and the like are exemplified in addition to the personal computer shown in FIG. 8A and the mobile phone shown in FIG. 8B.

The entire disclosure of Japanese Patent Application No. 2005-087820, filed Mar. 25, 2005, is expressly incorporated by reference herein.

What is claimed is:

1. A liquid crystal device comprising:
  a pair of substrates with liquid crystal interposed therebetween;

a first electrode formed above one of the pair of substrates;

a second electrode disposed corresponding to a separate pixel region, an electric field being generated between the first electrode and the second electrode; and an insulating layer disposed between the first electrode and the second electrode, wherein the second electrode includes a plurality of first conductive sections which extend along a predetermined direction and which are disposed adjacent to each other, the second electrode including a second conductive section which connects the plurality of first conductive sections, the first electrode including at least one aperture within at least one region corresponding to a gap region between adjacent ones of the plurality of first conductive sections, and the at least one aperture is located asymmetrically in, as opposed to being aligned at a midpoint of, the corresponding gap region in the predetermined direction.

2. The liquid crystal device according to claim 1, wherein the at least one aperture in the first electrode has a rectangular shape.

3. The liquid crystal device according to claim 1, further comprising an alignment film formed on the first and the second electrodes, the alignment film being subjected to a rubbing process in the predetermined direction.

4. The liquid crystal device according to claim 1, wherein the length of the at least one aperture in a direction crossing the predetermined direction is set to be larger than the length of each of the first conductive sections in the direction crossing the predetermined direction, and a portion of each of the at least one aperture overlaps a portion of a corresponding first conductive section in plan view.

5. The liquid crystal device according to claim 1, wherein the insulating layer is formed within the at least one aperture.

6. An electronic apparatus comprising the liquid crystal device according to claim 1 as a display unit.

7. A liquid crystal device comprising:

a pair of substrates with liquid crystal interposed therebetween;

a first electrode formed above one of the pair of substrates;

a second electrode disposed corresponding to a separate pixel region, an electric field being generated between the first electrode and the second electrode; and an insulating layer disposed between the first electrode and the second electrode, wherein the second electrode includes a plurality of first conductive sections which extend along a predetermined direction and which are disposed adjacent to each other, the second electrode including a second conductive section which connects the plurality of first conductive sections, the first electrode including at least one aperture within at least one region corresponding to a gap region between adjacent ones of the plurality of first conductive sections, and the at least one aperture is located asymmetrically in, as opposed to being aligned at a midpoint of, the corresponding gap region in a direction crossing the predetermined direction.

8. The liquid crystal device according to claim 1, wherein the at least one aperture is located at one end of the corresponding gap region in the predetermined direction.

9. The liquid crystal device according to claim 8, wherein the at least one aperture also is located at one side of the corresponding region in a direction crossing the predetermined direction.

10. The liquid crystal device according to claim 8, wherein the apertures at the same end of two adjacent gap regions of the second electrode are located at different sides of the two adjacent gap regions in a direction crossing the predetermined direction.

11. The liquid crystal device according to claim 1, wherein there are two of the apertures which are located at both ends of the at least one gap region in the predetermined direction.

12. The liquid crystal device according to claim 11, wherein the apertures which are located at both ends of the at least one gap region in the predetermined direction are located at different sides of the at least one gap region in a direction crossing the predetermined direction.

13. The liquid crystal device according to claim 11, wherein the apertures located at one end of two adjacent gap regions in the predetermined direction sandwich, and are located adjacent to, an interposed one of the first conductive sections, and the apertures at the other end of the two adjacent gap regions in the predetermined direction sandwich, but are separated from, the interposed one of the first conductive sections.

* * * * *